United States Patent [19]

Smith et al.

[11] Patent Number: 4,902,878

[45] Date of Patent: Feb. 20, 1990

[54] DATA ENTRY AND CONTROL ARRANGEMENT FOR AN APPLIANCE

[75] Inventors: John M. Smith, Louisville, Ky.; Martin H. Pitstick, Cleves, Ohio

[73] Assignee: General Electric Company, Louisville, Ky.

[21] Appl. No.: 267,501

[22] Filed: Nov. 4, 1988

[51] Int. Cl.⁴ .................................................. H05B 1/02
[52] U.S. Cl. ................................... 219/486; 219/483; 219/506; 219/492; 340/706
[58] Field of Search ................. 219/10.55 B, 492, 493, 219/506, 451, 453, 486, 483; 340/700, 706, 789, 721, 718

[56] References Cited

U.S. PATENT DOCUMENTS

| | | | |
|---|---|---|---|
| 4,011,428 | 3/1977 | Fosnough et al. | 219/10.55 B |
| 4,158,759 | 6/1979 | Mason | 219/10.55 B |
| 4,169,222 | 9/1979 | Tucker | 219/10.49 R |
| 4,308,443 | 12/1981 | Tucker et al. | 219/10.49 R |
| 4,343,990 | 8/1982 | Ueda | 219/492 |
| 4,399,352 | 8/1983 | Ueda | 219/506 |
| 4,406,945 | 9/1983 | Ueda et al. | 219/506 |
| 4,488,148 | 12/1984 | Kuciera | 340/700 |
| 4,527,049 | 7/1985 | Thomas et al. | 219/449 |
| 4,572,935 | 2/1986 | Karino | 219/10.55 B |
| 4,625,086 | 11/1986 | Karino | 219/10.55 B |
| 4,725,948 | 2/1988 | Mierzwinski | 364/400 |

Primary Examiner—M. H. Paschall
Attorney, Agent, or Firm—H. Neil Houser; Radford M. Reams

[57] ABSTRACT

An improved data entry and control arrangement for an appliance which includes an electronic display having a plurality of digits. User actuable up and down keys enable the user to adjust the value displayed. The control changes the display by a first amount, for example, one minute for a time display, in response to each momentary actuation of an up or down key. In response to continuous actuation, the control, after initially changing the display by the first amount, then switches the least significant digit of the display to zero and thereafter periodically changes the display by a second amount evenly divisible by ten, such as for example 10 minutes. The preferred update interval between changes is on the order of 0.45 seconds duration. The control also enables the user to change the update interval.

20 Claims, 6 Drawing Sheets

DATA ENTRY AND CONTROL ARRANGEMENT FOR AN APPLIANCE

BACKGROUND OF THE INVENTION

The invention relates generally to electronic controls for appliances and the like and more particularly to electronic data entry and display arrangements for such controls.

Electronic controls with digital displays and user actuable data entry touch key arrays are now commonly available with a variety of appliances such as microwave ovens, cooktops and ranges. The more commonly used arrangement with microwave ovens involves a key panel with ten numerical keys plus various function keys. The numerical keys are pressed to enter control parameters such as time or temperature. The number keys typically enter data in the order the keys are actuated starting with the most significant digit entered first. Each entry goes initially into the least significant digit position, shifting the preceding entry to the left with each successive pressing of a numerical key, until the desired parameter values are set in the display. Examples of such systems may be found in U.S. Pat. Nos. 4,343,990 and 4,011,428. This approach is satisfactory but requires a relatively large keyboard area and a relatively large number of switches adding to the complexity and cost of the keyboard and control.

Slew entry, a data entry technique in which a display runs through a sequence of numbers or other characters until the desired value or display appears, has long been employed in digital clocks to adjust the time setting and alarm setting. In order to speed up the data entry process, such digital clocks typically include a fast setting key and a slow setting key. To further speed up the process, a forward/reverse key may be provided to permit slewing in either direction. However, the fast setting typically involves a display which sequences so rapidly, particularly at the least significant digit position, that the flickering of that digit is unreadable, annoying and distracting, making it difficult to recognize the desired stopping point.

Slew entry has also been introduced in appliances such as microwave ovens as an improvement which simplifies the keyboard by replacing the ten numerical keys with slew pads. U.S. Pat. No. 4,158,759 discloses an arrangement in which a single slew pad is associated with each digit position in the display. Pressing one of the pads causes the associated digit position to cycle through numbers 0-9 until the key is released to stop the displayed digit at the desired value.

In U.S. Pat. No. 4,572,935 two keys, a temperature-up key and a temperature-down key, are provided for entering temperature set point data for a microwave oven. In one embodiment the display is set to 200° C. in response to the initial touching of either key. Thereafter, each time the up or down key is pressed the value increases or decreases by 5° C.

U.S. Pat. No. 4,308,443 discloses a control for an induction cooktop which enables the user to select the relative cooking power as a percentage. Hi, Lo and Off pads are provided for each surface unit. Touching the Hi pad causes the numerical display of percentage to increase in increments of ten as long as the Hi pad is touched. The displayed value decreases in increments of one as long as the Lo pad is touched.

U.S. Pat. No. 4,399,352 discloses a microwave oven which uses a key arrangement similar to the aforementioned '759 patent to enter time data, and which has a separate temperature set point display comprising nine segments, each representing a 10° temperature interval with the enter display covering the range from 170° C. to 250° C. A single temperature key increments the display by 10° C. per touch, or at a rate of one segment (corresponding to 10° C.) per second if continuously touched.

It is a primary object of the present invention to provide an improved data entry and display control arrangement for appliances which enables the user to quickly and accurately enter the desired time and/or temperature information using an up slew key and a down slew key, with a display which changes at a comfortable rate eliminating the rapid flickering in the least significant digit position.

It is a further object of the present invention to provide an improved data entry and display control arrangement of the aforementioned type which enables the user to adjust the update rate of the display.

SUMMARY OF THE INVENTION

In accordance with one aspect of the present invention there is provided an improved data entry and control arrangement for an appliance which includes an electronic display having a plurality of digits for displaying numerical operating data such as time and temperature. Data entry means is provided in the form of user actuable keys including an up key and a down key. Display control means responsive to the data entry means includes means for updating the display in response to actuation of the up or down key. The update means is operative to increase or decrease the display by a first amount, preferably one minute or 5° F. for time and temperature respectively, in response to each initial or momentary actuation of the up or down key respectively. In response to continuous actuation of the up or down key the update means is operative after initially changing the display by the first amount to then switch the least significant digit of the display to zero and thereafter change the display by a second amount evenly divisible by ten, such as for example 10 minutes or 10° F. at the end of each succeeding update interval as long as the up or down key remains continuously actuated. The preferred duration of the update interval is approximately 0.45 seconds. By this arrangement the display value can be changed relatively rapidly, yet the display remains comfortably readable since the least significant digit after the initial change remains zero, thereby eliminating the annoying and distracting flicker normally occurring in such arrangements.

In accordance with a second aspect of the invention means are provided to enable the user to adjust the update interval by selecting a value from the range of 0.25 seconds to 0.65 seconds. In a preferred form of this aspect of the invention the user can select one of the following discrete values in that range, namely 0.25 seconds, 0.35 seconds, 0.45 seconds, 0.55 seconds and 0.65 seconds. By this arrangement those individuals who find the nominal value of 0.45 seconds too fast can choose 0.55 or 0.65 seconds and those who prefer a display which operates faster can select 0.35 or 0.25 seconds for the update interval.

BRIEF DESCRIPTION OF THE DRAWINGS

While the novel features of the invention are set forth with particularity in the appended claims, the invention both as to organization and content will be better understood and appreciated along with other objects and features thereof from the following description taken in conjunction with the drawings in which:

DETAILED DESCRIPTION

Figure 1:
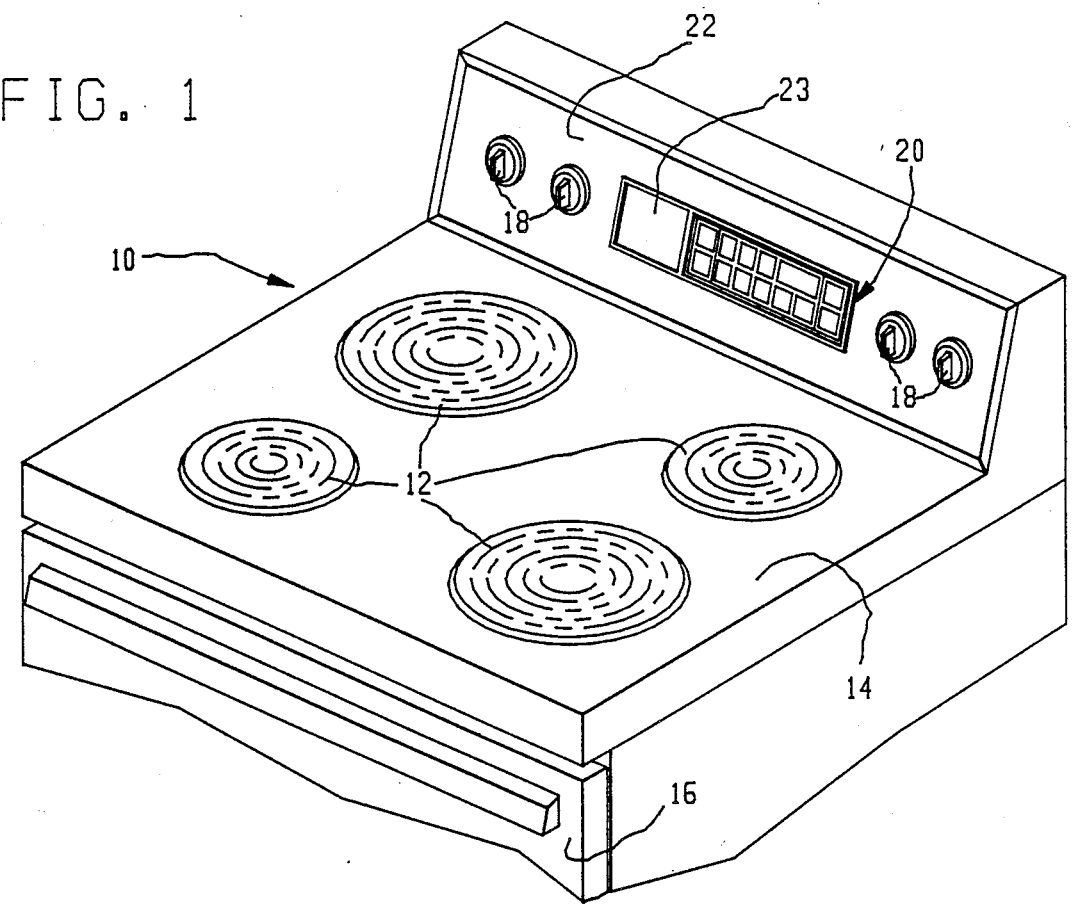
FIG. 1 is a perspective view of the upper portion of a free-standing range illustratively embodying the improved data entry and display arrangement of the present invention.
Figure 2:
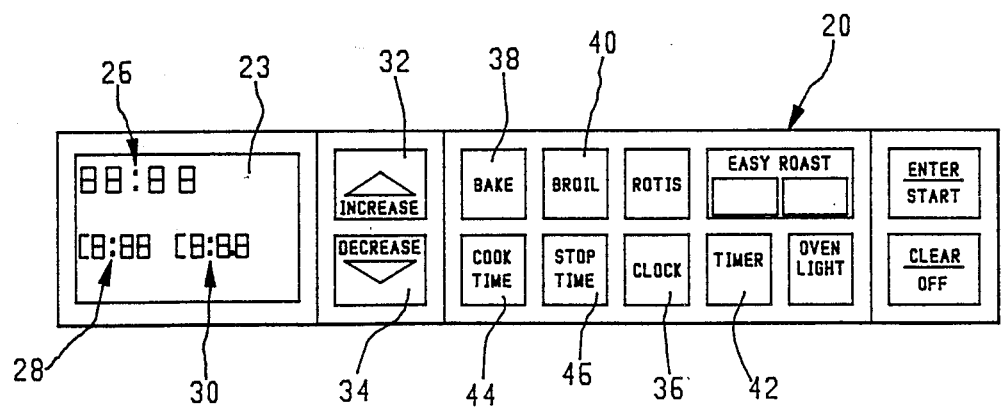
FIG. 2 is an enlarged plan view of the touch panel and display portion of the control panel of the range of FIG. 1.

Referring now to the drawings and in particular to FIGS. 1 and 2, there is shown a free-standing range 10 with four conventional surface units 12 supported from cooktop surface 14 and an oven enclosed by oven door 16. Control knobs 18 for the surface units and oven controls comprising a touch switch array 20 are supported from the backsplash comprising glass control panel 22. Viewing area 23 on panel 22 exposes an electronic display behind the glass panel aligned with the viewing area opening. As best seen in FIG. 2, this display includes a time display 26 comprising two minute and two hour digits separated by a colon, and two similar additional displays 28 and 30. Display 26 is active in the clock mode to display real time. Display 28 selectively displays cooking time, cleaning time, the start time for a baking cycle and the food temperature when used in combination with a temperature probe (not shown). Display 30 selectively displays the oven temperature, the cooking cycle stop time, the selected weight for the load being cooked when operated in the Easy Roast mode, and the broil rate. Though not shown in FIG. 2 the display area 23 may also include other indicia for conveying information to the user relating to cooking mode and various selections for operating in the Easy Roast mode.

Also as best seen in FIG. 2, the touch switch array 20 includes up and down keys 32 and 34, and numerous function keys. The function keys include a real time clock setting key 36, a bake key 38, a broil key 40 and timer key 42 and cook time and stop time selection keys 44 and 46 respectively. In the illustrative embodiment the touch switch array 20 is a membrane touch switch array of generally conventional construction. Structural details of a mounting arrangement for the touch key arrangement are disclosed in co-pending patent application (Ser. No. 267,507 filed Nov. 4, 1988, pending, Smith et al), the disclosure of which is hereby incorporated by reference.

Data entry for time, temperature, weight and other information is via the function keys in combination with the up and down keys 32 and 34 referred to collectively as slew keys. Slewing or slew entry as used herein refers to the data entry technique whereby in response to actuation of one of the slew keys the display is incremented or decremented through a sequence of values or characters until the desired value or character appears.

As noted in the Background discussion the general slew entry concept is commonly used in setting digital clocks and selecting temperature set points or power levels for microwave ovens and power levels for cooktop surface units. The present invention envisions an improved arrangement for slew entry which enables the user to rapidly arrive at the desired input setting and which is easy to control and comfortable to use. Specifically, in display control arrangement in accordance with the present invention, the display can be rapidly slewed to a value close to the desired value by continuous actuation of one of the slew keys and increased or decreased in small fixed increments in response to momentary touches of one of the slew keys for fine adjustments or small changes with the display at all times being easily readable to permit the recognition of the desired stopping point.

As will be described in greater detail hereinafter, the control routines for the microprocessor controlled display updates the display periodically with the update interval, that is, the period between updates being on the order of 0.25-0.65 seconds. As used herein, momentary actuation shall be understood to mean actuation, the duration of which does not exceed one display update interval. A momentary actuation changes the display by a discrete amount. Continuous actuation shall be understood to mean actuation for a period longer than one update interval. In order to maintain a comfortably readable display while a key is continuously actuated, the control switches the least significant digit to zero and thereafter the display is periodically changed by an amount evenly divisible by ten. Consequently, the least significant digit remains zero as the more significant digits change. In a preferred form of the invention the amount for continuously changing the display is ten, resulting in the least significant digit remaining zero and the next higher order digit changing by one unit at the end of each update interval. This permits slewing at a relatively rapid rate for quick convenient response, while providing a display which is much more comfortable to the eye and easier for the user to determine when the displayed value is approximately reached.

In the illustrative embodiment when the display is representing time data the least significant digit represents minutes. In response to momentary actuation, the display changes in one minute increments. In response to continuous actuation, after the initial transition, comprising the initial change of one minute and the subsequent switching of the least significant digit to zero, the display changes in ten minute increments. For example, assume the user wishes to change the setting of the real time clock display 26 from 5:15 to 5:48. The user first actuates the clock function key 36 then touches the up slew key 32. In response to the initial touch of the up key the display changes from 5:15 to 5:16. At the end of the next update interval the display then changes to 5:20 and thereafter at each succeeding update interval, the display changes by 10 minute increments for a sequence of 5:20→5:30→5:40→5:50, and upon reaching 5:50 the user releases the key to hold the display at 5:50. The final adjustment involves touching the down key momentarily twice to decrement the display in one minute steps to 5:48.

The same procedure is used to enter starting and stopping times such as for scheduling baking operations except that the cook time and stop time keys are used respectively to initiate those processes and the displays appear at 28 and 30 respectively.

When entering temperature data, momentary actuations cause changes in 5° increments. Continuous actuation changes the display in 10° increments once the display temperature reaches a value evenly divisible by 10. For example, to select a set point temperature for the Bake mode the user first actuates the bake key to bring up an oven temperature display at 30. The initial value displayed will be the set point from the last use of the Bake mode. Assume for purposes of illustration that the previous setting was 475° and the desired new setting is 325°. To change the setting the user touches the down key 34 and holds it down until the display reads 330° F. The display will change from 475° to 470° in response to the initial touching of the down key. Thereafter the least significant digit will remain 0 and the display will change from 470° to 330° in 10° increments at each update interval. A further momentary touch of the down key following the continuous actuation of the down key adjusts the value from 330° to 325°.

In the illustrative embodiment the nominal update interval is selected to be approximately 0.45 seconds, that is the display is updated every 0.45 seconds. This rate provides a sufficiently rapid change of setting for convenient use and provides a display which is comfortable to observe and is easily stopped at the desired setting.

While the 0.45 second update interval is thought to provide a rate which is comfortable to the majority of users, it is also recognized personal preferences may vary somewhat. Therefore, in accordance with a second aspect of this invention, means are provided to permit adjustment of the update interval over a predetermined range. In the illustrative embodiment this range is from 0.25 seconds to 0.65 seconds. Specifically, five discrete values are selectable in this range, 0.25 seconds, 0.35 seconds, 0.45 seconds, 0.55 seconds and 0.65 seconds.

To change the update interval duration, the user must initiate operation in a special mode designated the Slew Rate mode. Selection of the Slew Rate mode which utilizes both slew keys is valid only when operating in the real time display mode. When in the real time mode, continuous simultaneous actuation of both the up and down keys initiates operation in the Slew Rate mode. In this mode, a number from 1 to 5 is initially displayed, representing the corresponding update interval then being implemented. The values 1-5 represent update intervals 0.65-0.25 respectively. When in this mode the display value is increased or decreased by touching the up or down key respectively. The display changes by one in response to each momentary actuation. If continuously actuated, the display will slew by one at the rate set by the then prevailing update interval. Operation in the Slew Rate mode is terminated by touching any one of the function keys, which changes the update interval to the newly selected value and returns the system to the real time mode.

Figure 3:
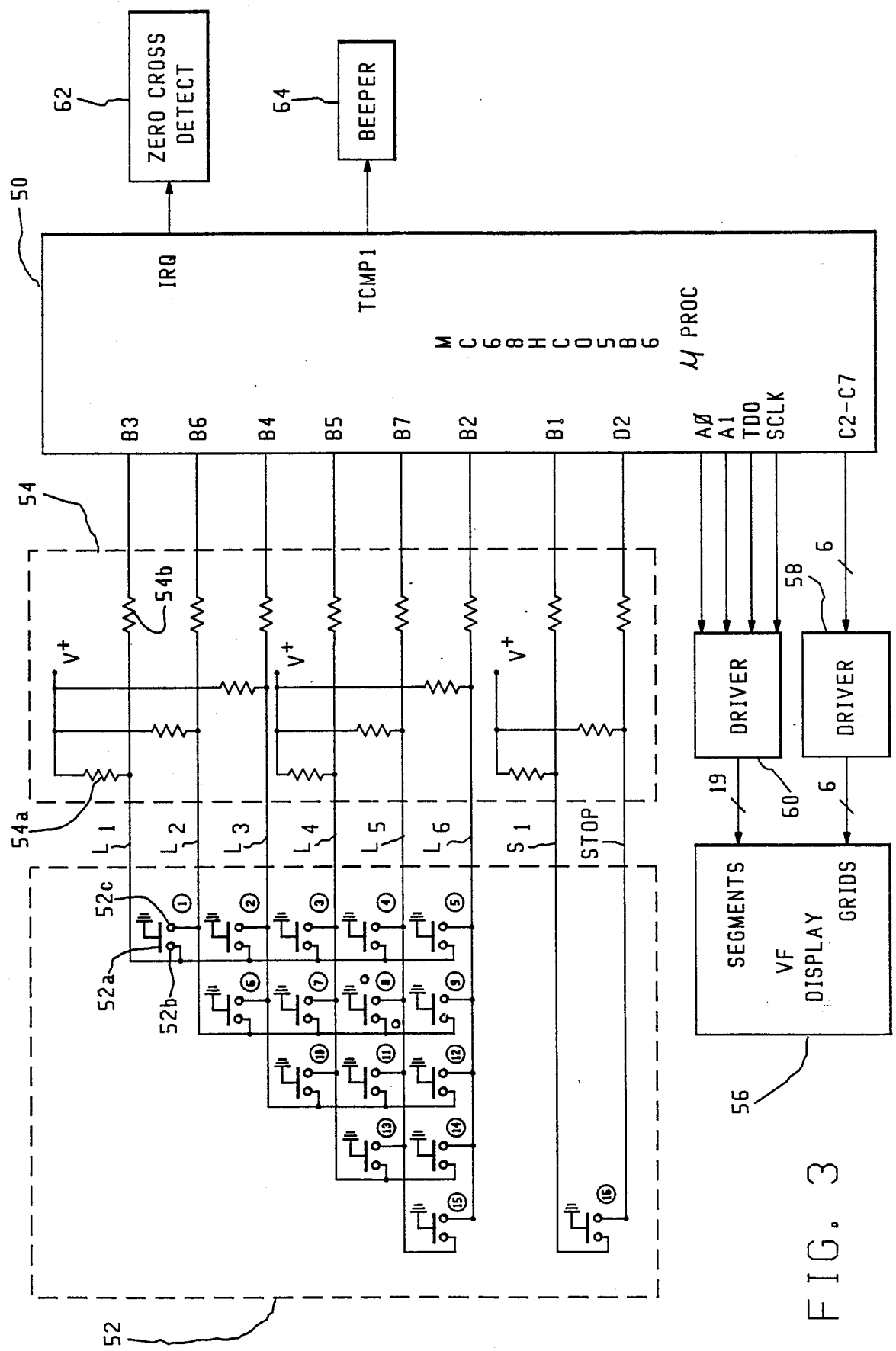
FIG. 3 is a simplified schematic circuit diagram of the display control arrangement for the range of FIG. 1.

A simplified schematic circuit diagram for the display control arrangement of the illustrative embodiment is shown in FIG. 3. Microprocessor 50, which in the illustrative embodiment is a chip designated MC68HC05B6 commercially available from Motorola, receives inputs from keyboard matrix 52 on lines labeled L1-L6, S1 and Stop via interface circuitry 54, and supplies output signals to VF display 56 via driver circuits 58 and 60. A conventional zero crossing detect circuit 62 synchronizes the internal operation of microprocessor 50 with zero crossings of the 60 HZ AC power signals (not shown) which energizes the various range components as well as the control circuitry. A conventional beeper circuit 64 is selectively enabled by microprocessor 50 to provide an audible signal to acknowledge valid touch pad actuations.

Each touch pad location in keyboard matrix 52 has a pair of output lines uniquely associated with it. Contacts are provided at each touch pad location to selectively couple the associated pair of the output lines L1-L6, S1 and Stop associated with that particular location to ground. Actuation of a touch pad couples both associated lines to ground. For example, referring specifically to touch pad location 1, grounded shorting contact 52a closes across contacts 52b and 52c from lines L1 and L2. Microprocessor 50 identifies the actuated touch pad location by detecting two grounded input lines. The control function and pair of output lines associated with each of locations 1-16 are shown in Table I, for those keys appearing in the touch pad array in FIG. 2.

TABLE I

| Location | Function Key | Output Lines |
|---|---|---|
| 1 | — | L1, L2 |
| 2 | Cook Time | L1, L3 |
| 3 | Slew Down | L1, L4 |
| 4 | Boneless | L1, L5 |
| 5 | Bake | L1, L6 |
| 6 | — | L2, L3 |
| 7 | Timer | L2, L4 |
| 8 | Enter/Start | L2, L5 |
| 9 | With Bone | L2, L6 |
| 10 | — | L3, L4 |
| 11 | Broil | L3, L5 |
| 12 | Slew Up | L3, L6 |
| 13 | Clock | L4, L5 |
| 14 | — | |
| 15 | Stop Time | L5, L6 |
| 16 | Clear/Off | S1, Stop |

Interface circuitry 54 comprises a pull up resistor 54(a) and a current limiting resistor 54(b) for each output line. One end of pull up resistor 52a for each line is connected to a dc voltage source designated V+ and the other end is connected to the corresponding one of output lines L1-L6, S1 and Stop. Current limiting resistor 54(b) is connected between the junction of the output line and the pull up L resistor and the corresponding one of microprocessor input ports B1-B7 and D2.

Nominal values for resistors 54a and 54b are 270K ohms and 100K ohms respectively and the value for voltage supply V+ is 5 volts.

Vacuum fluorescent (VF) display 56 comprises 6 grids or individual displays each comprising 19 controllable segments. Though custom configured to provide the desired display arrangement, the display bottle is of the type commercially available from Futaba and NEC.

Six grid control outputs from output ports C2-C7 of microprocessor 50 are coupled to six grid control inputs of display 56 via power driver interface circuit 58, which may be a standard driver circuit such as a UDN 6118 available from Sprague. The driver circuit is needed to meet the high current requirements of the particular display.

Driver circuit 60 is a conventional serial to parallel high voltage VF display driver circuit such as a UCN 5812 also commercially available from Sprague.

Driver circuit 60 receives control inputs from ports A0, A1, TDO and SCLK of microprocessor 50. Port TDO provides segment control data in serial form for the 19 controlled display segments. Port SCLK provides clock signals and ports A0 and A1 provide enable and strobe signals respectively.

Microprocessor 72 is customized to perform the display control functions in accordance with this invention by permanently configuring the read only memory (ROM) of microprocessor 72 to implement predetermined control instructions. FIGS. 4-7 are flow diagrams which illustrate display control routines incorporating the control program of microprocessor 72 for the illustrative embodiment of the present invention herein described. From these diagrams one of ordinary skill in the programming art can prepare a set of control instructions for permanent storage in the ROM of microprocessor 72. For the sake of simplicity and brevity the control routines to follow will be described with respect only to implementation of the set point selection and display control algorithms of the present invention. It should be understood that in addition to these control functions there may be other control functions relative to other operations of the appliance to be performed in conjunction with other operating characteristics of the appliance. Instructions for carrying out the routines described in the diagrams may be interleaved with instructions and routines for other control functions which are not part of the present invention.

Figure 4:
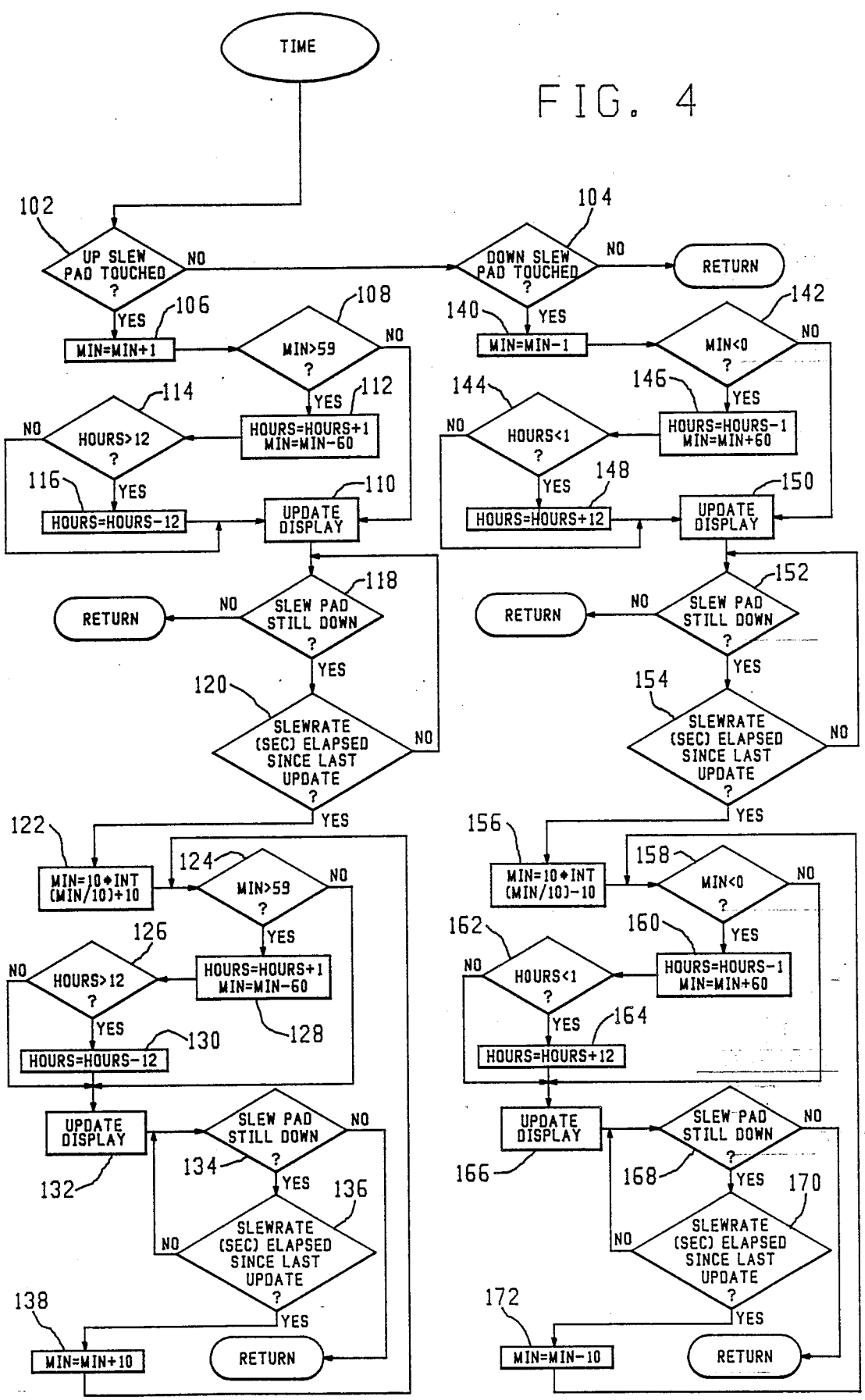
FIGS. 4-7 are flow diagrams representing display control routines incorporated in the control program for the microprocessor in the circuit of FIG. 3.

Referring now to FIG. 4 a flow diagram illustrates the Time routine, the control routine for entering time data in response to actuation of the clock key and the up and down slew pads. The purpose of this routine is to increment or decrement the real time display 26 (FIG. 2) in response to user actuation of the up and down slew keys 32 and 34. Specifically, the display is changed by 1 minute units in response to momentary actuations of the up and down keys. In response to continuous actuation, the display responds to the initial touch in the same manner as the hereinbefore described response to a momentary touch. Upon detecting that the touch is continuing beyond one update interval, the least significant digit in the minute display is switched to zero and the display is thereafter changed in 10 minute amounts thereby changing the next higher order digit by one unit increments at a predetermined rate for as long as the slew pad remains actuated. This predetermined rate is established by the value of the variable designated Slew Rate.

This routine is entered in response to user actuation of the clock touch pad. On entering the routine inquiries 102 and 104 determine whether an up slew pad or a down slew pad has been touched respectively. Upon the detection of an initial touch of the up slew pad at inquiry 102, the least significant digit representing minutes represented by the variable MIN is incremented by 1 (Block 106). Inquiry 108 determines whether the new value of the minutes variable is greater than 59 minutes. If not, the display is immediately updated (Block 110). If the value exceeds 59, the hours portion of the display is incremented by 1 and the minutes portion is reset to 0 (Block 112). Next Inquiry 114 determines if the value of the hours variable exceeds 12. If it is, the hours portion of the display is reset to 0 (Block 116). Next the display is updated to reflect the new display value. Having updated the display to respond to the initial touch of the slew pad, Inquiry 118 determines if the slew pad remains touched. If yes, Inquiry 120 determines whether an update interval, of duration represented by the variable Slew Rate in seconds, has elapsed. If not, the program returns to Inquiry 118 and loops between 118 and 120 until the slew pad is released or the update interval has elapsed. If the slew pad is released before the interval has elapsed, the program merely returns to the main control program. If it remains actuated until the interval elapses, the value of the minutes interval is rounded down to a next lowest value evenly divisible by 10 and then increased by 10 (Block 122). This switches the least significant digit of the display to 0 and increments the next significant digit by 1. Next the hours variable is incremented when the minutes exceed 60 and the minutes are reset to 0 and the hours variable is reset to 0 when it exceeds 12 (Inquiries 124 and 126 and Blocks 128 and 130). The display is then updated (Block 132) and Inquiries 134 and 136 again wait for either the slew pad to be released or for the next control update interval to elapse. If the next interval elapses before the slew pad is released, the minutes display is incremented by 10 (Block 138) and the program returns to Inquiry 124 to repeat Inquiries in Blocks 124-138 until the slew pad is released. This portion of the program continues to update the display in increments of 10 at the end of each update interval until the slew pad is released. Upon release of the slew pad the program returns to the main control program.

If the touching of a down slew pad is detected at Inquiry 104, the minutes variable (MIN) is decremented by 1 (Block 140). Inquiries 142 and 144 and Blocks 146 and 148 make appropriate adjustments in the minutes and hours display to reflect the 1 minute decrement and the display is updated at Block 150. Inquiries 152 and 154 determine if the slew pad remains actuated until the end of the next update interval. If not, the program returns to the main control program. If the pad is still down when the update interval has elapsed, the minutes variable is rounded down to the next value evenly divisible by 10 and decremented by 10 (Block 156). Inquiries 158 and 162 and Blocks 160 and 164 make the appropriate adjustments in the minutes and hours variable to reflect the 10 minute decrement and the display is updated (Block 166). Inquiries 168 and 170 determine if a slew pad remains actuated until the next control interval elapses. If so, the display is decremented by 10 and the program returns to Inquiry 158 to appropriately adjust the hours and minutes values. The display is again updated and the program then again awaits the elapse of the next occurring update interval or release of the slew pad. This loop continues until the slew pad is released. When the slew pad is released, the program returns to the main control program.

The above described routine for entering time data is used for updating the real time display. It will be appreciated that a similar routine is used to enter time data for the cook time and stop time displays as well, the difference being essentially that a different display is updated depending upon which function key is actuated by the user to initiate the update process.

Figure 5:
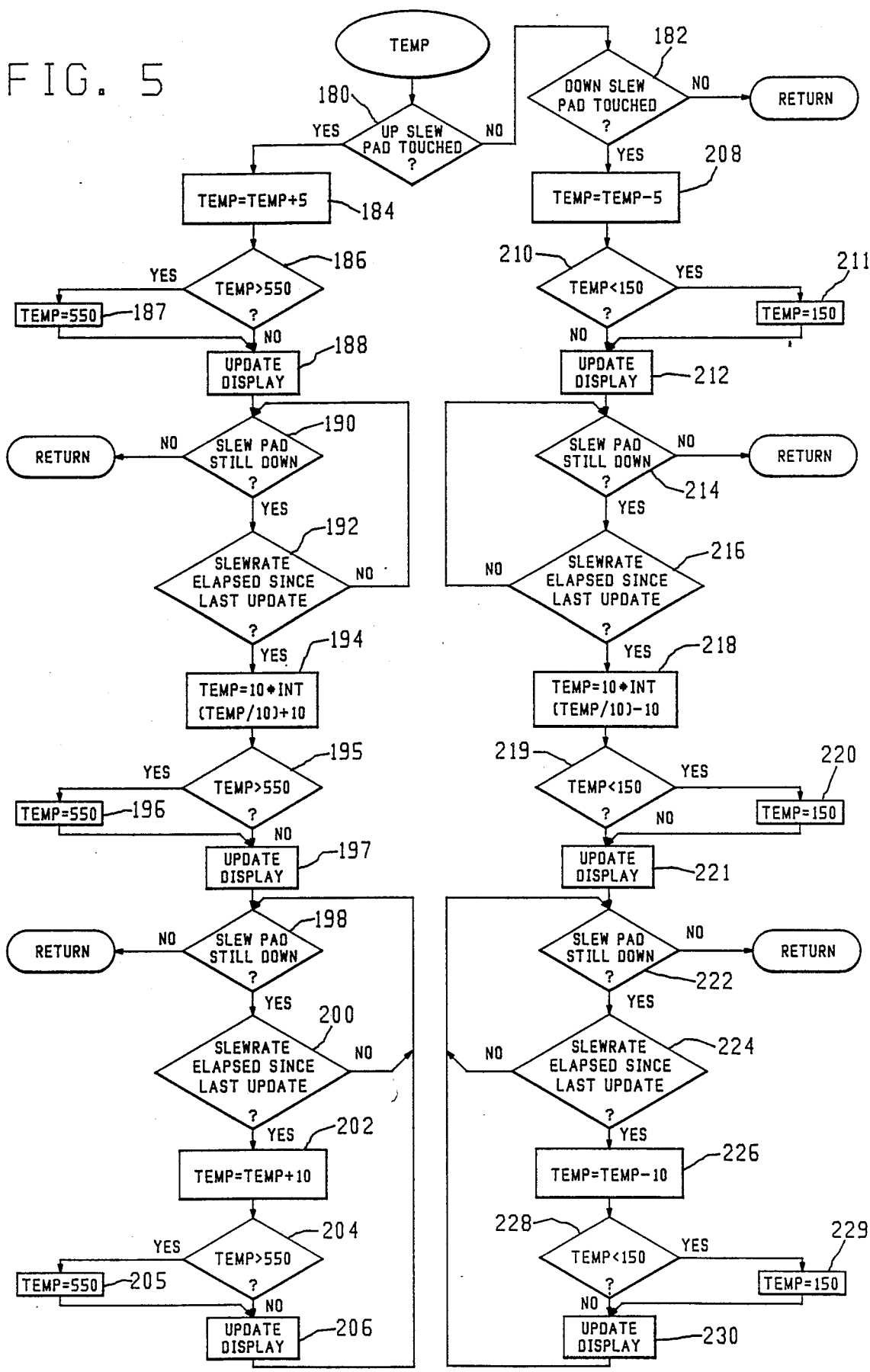

Referring next to FIG. 5, there is illustrated a flow diagram for the Temp routine. This routine, which is entered in response to user actuation of the Bake key, permits the user to input the desired baking set point temperature for the Bake operating mode. The function of this routine is to increase or decrease the temperature display by 5° in response to the discrete momentary actuation of the up or down slew key respectively, and to detect continuous actuation of the up or down slew pad and switch the least significant digit of the temperature display to 0 and increase or decrease the display by 10 at a predetermined rate until the up or down slew pad is released. The permissible range for temperature selection is from 150° to 550° F. As in the Time routine (FIG. 4) the rate is set by the value of the variable Slew Rate which establishes the duration of each update interval.

On entering this routine Inquiries 180 and 182 determine if an up or down slew pad has been touched respectively. Upon detection of the touching of an up slew pad at Inquiry 180, the temperature variable TEMP is incremented by 5° (Block 184) and Inquiry 186 determines if the new value is greater than the maximum permitted value of 550°. If yes, the set point display is set to the maximum of 550° (Block 187), and the display is updated (Block 188). If the new value is not greater than 550°, the display is simply updated (Block 188). Inquiries 190 and 192 determine if the slew pad remains actuated until the end of the update interval. If not, the program returns to the main control program. If the slew pad remains actuated until the update interval elapses, the temperature value is rounded down to the nearest value evenly divisible by 10 and incremented by 10 (Block 194). Inquiry 195 and Block 196 again limit the display to the maximum of 550°, and the display is updated (Block 197). Inquires 198 and 200 again determine if the slew pad remains actuated. If the pad remains actuated until the next update interval elapses, Temp is again incremented by 10 (Block 202). Inquiry 204 and Block 205 again limit the maximum temperature to 550°, the display is updated (Block 206), and the program loops back to Inquiry 198 to determine if the slew pad remains actuated. The program as illustrated by Inquiries 198, 200, 204 and Blocks 202, 205 and 206 continue to update the temperature display in 10° increments at the expiration of each update interval until the maximum is reached or the slew pad is released. On release of the slew pad the program returns to the main control program.

Returning to Inquiry 182, if the down slew pad is touched, Temp is decremented by 5 (Block 208). Inquiry 210 and Block 211 limit the display to the minimum selectable value of 150° and the display is updated (Block 212). Inquiries 214 and 216 determine if the slew pad remains actuated until the next update interval has elapsed. If not, the program returns to the main control program. If the slew pad remains actuated, Temp is rounded down to a value evenly divisible by 10 and decremented by 10° (Block 218). The temperature display is again limited to a minimum of 150° (Inquiry 219 and Block 220) and the display is updated (Block 221). Inquiries 222 and 224 determine if the slew pad continues to be actuated through the end of the next update interval. If not, the program returns to the main control program. If the slew pad remains actuated, the temperature display is decremented by 10 (Block 226). Inquiry 228 and Block 229 ensure that Temp is not less than 150° and the display is updated (Block 230). The program as illustrated by Inquiries 222, 224 and 228 and Blocks 226, 229 and 230 continues to decrement the temperature display by 10° at the end of each update interval as long as the slew pad remains actuated or until the minimum temperature is reached.

The Temp routine described above is used to update the temperature value when operating in the Bake mode. A similar routine is used to update the temperature display when operating in the Temp Cook mode utilizing a temperature probe in the oven. The difference is that a different portion of the main display is controlled in response to actuation of that function key.

In both the above described time and temperature entry control routines use is made of a variable designated Slew Rate which represents the duration of the update interval, which in turn establishes the rate at which the display is slewed. It will be recalled that in accordance with one aspect of the invention, means are provided to enable the user to change or adjust the slew rate by selecting one of five available different durations for the update interval. The flow diagrams of FIGS. 6 and 7 illustrate the control routines for providing this slew rate selection means.

Specifically, the slew rate mode is selected in the illustrative embodiment by simultaneous actuation by the user of both the up and down slew keys for a period of four seconds. The SR mode routine illustrated in FIG. 6 detects user selection of the slew rate mode. It will be recalled that the user can initiate the slew rate mode to change the slew rate only when the control is operating in the real time clock mode. This routine is entered each pass through the control routine for operation in the clock mode to detect selection of the slew rate selection mode.

Figure 6:
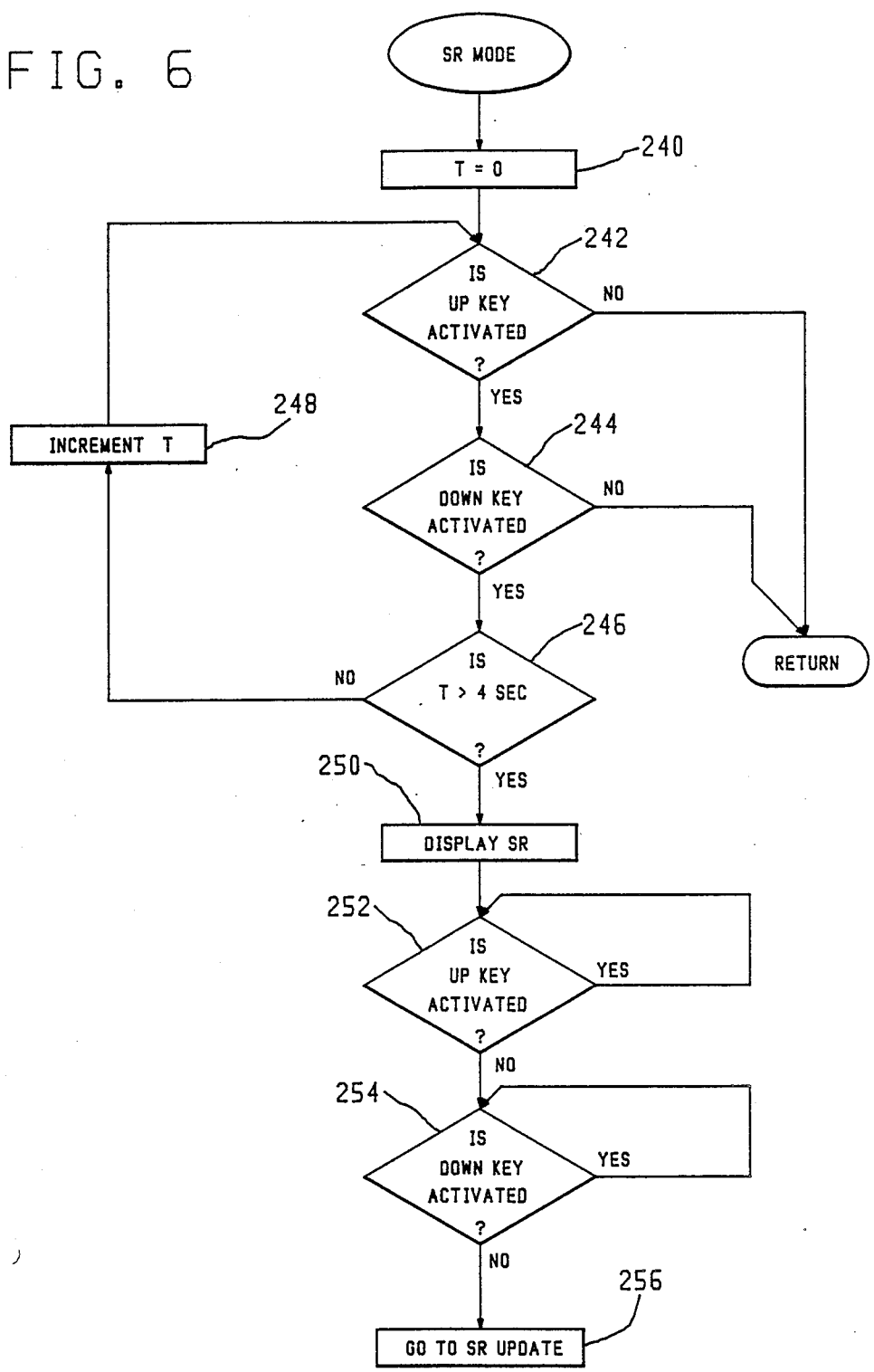
Figure 7:
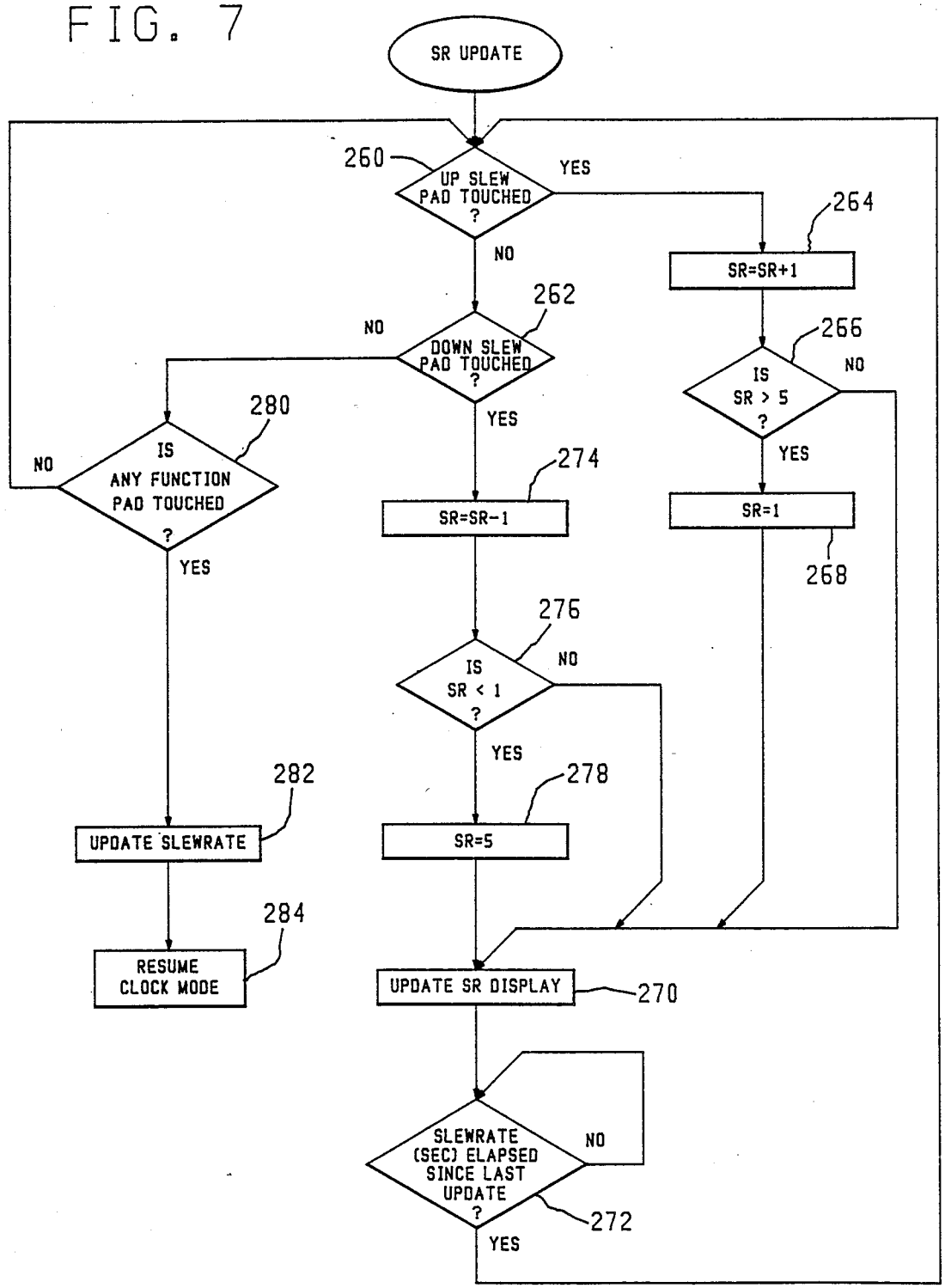

Referring now to FIG. 6, on entering the SR mode routine the time variable T, used in monitoring the duration of key actuation, is set to 0 (Block 240). Inquiries 242 and 244 look for actuation of the up key and down key respectively. If both are simultaneously actuated, Inquiry 246 determines if the four second time period has elapsed. If not, the time variable T is incremented (Block 248) and the program returns to Inquiry 242 to repeat the loop until either at least one key is released or the 4 second period elapses. If both keys remain actuated for the four second period, the program then proceeds to display the current slew rate value represented by the variable SR (Block 250). The SR variable will equal one of the integer values 1 thru 5 which represent update interval durations of 0.65, 0.55, 0.45, 0.35 and 0.25 seconds respectively. Inquiries 252 and 254 then hold the program in this portion of the routine until both up and down keys have been released. Upon release of both keys, the program proceeds (Block 256) to the SR update routine (FIG. 7).

The function of the SR update routine is to increment or decrement the SR variable to enable the user to change the duration of the update interval. This routine is only entered from the SR mode routine, and thus is only entered when the user has selected the slew rate mode by simultaneous actuation of both up and down keys as above described.

Upon entering this routine Inquiries 260 and 262 determine if an up or a down slew pad has been touched respectively. If the up pad has been actuated, the SR variable is increased by 1 (Block 264). Inquiry 266 and Block 268 limit the value of SR to the maximum of 5, by returning the display to 1 when the user attempts to increment it beyond 5. Having established the appropriate updated value for SR, the SR display is updated (Block 270) and Inquiry 272 determines if the update interval has elapsed. Upon determining that the update interval has elapsed, the program returns to Inquiry 260 to determine if the slew pad remains touched or has been touched again. For this arrangement the slew pad is incremented by 1 in response to each momentary actuation of the slew pad and is incremented by 1 continuously at a rate established by the update interval rate if the slew pad remains touched continuously. If Inquiry 262 detects selection of the down slew pad, the SR variable is decremented by 1 (Block 274). Inquiry 276 and Block 278 limit SR to the minimum value of 1 by reverting SR to 5 when the user attempts to decrement to less than 1. Having established the correct decremented value for SR, the display is updated at 270 and the program proceeds at 272 as described above.

The update mode is terminated by the touching of any function key other than a slew key. If neither slew pad is touched, Inquiry 280 determines if any other function pad is touched. If so, the variable Slew Rate is updated (Block 282) to reflect the newly selected value for variable SR, that is Slew Rate is set to the corresponding time in seconds for the numerical value of SR and the program returns to the real time clock mode (Block 284).

It will be apparent from the foregoing description that the present invention provides an improved data slew entry arrangement in which the display is updated rapidly, yet provides a display which is comfortable to the observer and which permits the observer to easily identify when the display is approaching the desired value and which enables the user to select an update interval or a slew rate which is most satisfying to his individual taste.

While in accordance with the Patent Statutes a specific embodiment of the present invention has been illustrated and described herein, it is realized that numerous modifications and changes will occur to those skilled in the art. For example, though the illustrative embodiment is an oven control for a range, the data entry and display control could also be employed in other control applications, such as microwave ovens and electronic thermostat controls for heating and air conditioning systems. It is therefore to be understood that the appended claims are intended to cover all such modifications and changes as fall within the true spirit and scope of the invention.

What is claimed is:

1. A data entry and display control arrangement comprising:
   electronic display means having a plurality of digits including a least significant digit and at least one higher order digit for displaying numerical operating data;
   data entry means comprising a plurality of user actuable keys including an up key and a down key;
   display control means responsive to said data entry means;
   said display control means including update means for periodically updating said display at regular update intervals of predetermined duration, in response to actuation of said up or down key;
   said update means being operative to increase or decrease said display by a first amount in response to each initial actuation of said up or down key respectively, and to switch said least significant digit to zero and thereafter increase or decrease said display by a second amount, evenly divisible by ten at the end of each succeeding update interval as long as said up or down key remains continuously actuated, whereby the display is changed in relatively small increments when an up or down key is momentarily actuated and in larger increments with the displayed values evenly divisible by ten when an up or down key is continuously actuated.

2. A control arrangement in accordance with claim 1 wherein said update interval is of approximately 0.45 seconds duration.

3. A control arrangement in accordance with claim 1 further comprising means for changing the duration of said update interval.

4. A control arrangement in accordance with claim 1 further comprising means for selectively setting the duration of said update interval at one of a plurality of predetermined intervals in the range of 0.25 seconds to 0.65 seconds.

5. A control arrangement in accordance with claim 1 further comprising means for selectively setting the duration of said update interval at a value selected from a range of update interval values including 0.45 seconds.

6. A control arrangement in accordance with claim 1 further comprising means for selectively setting the duration of said update interval at one of a plurality of selectable update interval values including 0.25 seconds, 0.35 seconds, 0.45 seconds, 0.55 seconds and 0.65 seconds.

7. A control arrangement in accordance with claim 1 wherein said numerical operating data comprises time data, said least significant digit representing minutes, said first amount being one minute and said second amount being ten minutes, whereby said display is increased or decreased in one minute increments in response to momentary actuation and in 10 minute increments when said up or down key remains continuously actuated.

8. A control arrangement in accordance with claim 1 wherein said numerical operating data comprises temperature data, said least significant digit representing degrees, said first amount being five degrees and said second amount being ten degrees, whereby said display is increased or decreased in five degree increments in response to the momentary actuation of one of said up or down keys respectively and periodically increased or decreased in ten degree increments in response to continuous actuation thereof.

9. A data entry and display control arrangement comprising:
   electronic display means comprising a plurality of digits including a least significant digit and at least one higher order digit for displaying numerical operating data;
   data entry means comprising a plurality of user actuable keys including an up key and a down key;
   display control means responsive to said data entry means for controlling said electronic display means;
   said display control means including display update means operative in response to actuation of said user actuable keys to periodically update said display at a predetermined update rate, the period between successive updates defining an update interval;
   said display update means comprising means responsive to actuation of one of said up or down keys to change said least significant display digit by one unit at the first display update following key actuation, and operative to set said least significant digit to zero and change the next higher order digit by one unit at the end of each succeeding update interval as long as said up or down key remains continuously actuated, whereby said display value changes by one unit in response to each momentary actuation of said up or down key and displays a value evenly divisible by ten which changes in ten unit increments at a predetermined update rate in response to continuous actuation of said up or down key.

10. A data entry and display control arrangement in accordance with claim 9 wherein said update interval is of approximately 0.45 seconds duration.

11. A data entry and display control arrangement in accordance with claim 9 further comprising means for selecting the duration of the update interval from a range of interval values varying between 0.25 seconds and 0.65 seconds.

12. A data entry and display control arrangement in accordance with claim 9 further comprising means for selecting the duration of the update interval from a range of interval values including 0.45 seconds.

13. A data entry and display control arrangement in accordance with claim 12 wherein said range of discrete interval values further includes 0.25 seconds, 0.35 seconds, 0.55 seconds and 0.65 seconds.

14. A data entry and display control arrangement comprising:
  electronic display means including a plurality of digits including a least significant digit and at least one higher order digit for displaying numerical operating data;
  data entry means comprising a plurality of user actuable keys including first and second function keys, an up key and a down key;
  display control means responsive to said data entry means for controlling said electronic display means;
  said display control means including display update means operative in response to actuation of said user actuable keys to periodically update said display digits at a predetermined update rate, the period between successive updates defining an update interval;
  said display update means being operative in response to actuation of one of said first or second function keys and one of said up or down keys to increase or decrease respectively said display by a first amount upon the next occurring update, and to set said least significant digit to zero and increase or decrease said display respectively by a second amount evenly divisible by ten, at each subsequent update as long as said up or down key remains continuously actuated.

15. A data entry and display control arrangement in accordance with claim 14 wherein said first and second function keys comprise time and temperature selecting keys respectively, said display being operative to display numerical operating data representing time data when said time selecting key is actuated, said first and second amounts being one minute and ten minutes respectively, said display means being operative to display numerical operating data representing temperature data when said temperature selecting key is actuated, said first and second amounts being five degrees and ten degrees respectively.

16. A data entry and display control arrangement in accordance with claim 15 further comprising means for changing the duration of said update interval.

17. A data entry and display control arrangement in accordance with claim 15 wherein said update interval is of approximately 0.45 seconds duration.

18. A data entry and display control arrangement in accordance with claim 15 further comprising means for selecting the duration of said update interval from a range of interval values varying between 0.25 seconds and 0.65 seconds.

19. A data entry and display control arrangement in accordance with claim 15 further comprising means for selecting the duration of the update interval from a range of discrete interval values including 0.45 seconds.

20. A data entry and display control arrangement in accordance with claim 19 wherein said range of discrete interval values further includes 0.25 seconds, 0.35 seconds, 0.55 seconds and 0.65 seconds.

* * * * *